(12) United States Patent
Qiu et al.

(10) Patent No.: US 10,527,420 B2
(45) Date of Patent: Jan. 7, 2020

(54) ELASTIC BUMP STOPS FOR MEMS DEVICES

(71) Applicant: Invensense, Inc., San Jose, CA (US)

(72) Inventors: Jin Qiu, Sunnyvale, CA (US); Joseph Seeger, Menlo Park, CA (US)

(73) Assignee: Invensense, Inc., San Jose, CA (US)

( * ) Notice: Subject to any disclaimer, the term of this patent is extended or adjusted under 35 U.S.C. 154(b) by 0 days.

(21) Appl. No.: 16/044,463

(22) Filed: Jul. 24, 2018

(65) Prior Publication Data

US 2018/0347984 A1    Dec. 6, 2018

Related U.S. Application Data (63) Continuation of application No. 14/050,201, filed on Oct. 9, 2013, now abandoned.

(60) Provisional application No. 61/790,300, filed on Mar. 15, 2013.

(51) Int. Cl.
*G01C 19/5733*  (2012.01)
*G01P 15/125*  (2006.01)
*G01P 15/08*  (2006.01)

(52) U.S. Cl.
CPC .. *G01C 19/5733* (2013.01); *G01P 2015/0871* (2013.01); *G01P 2015/0874* (2013.01)

(58) Field of Classification Search
CPC ............... G01P 2015/0871; G01P 2015/0874
See application file for complete search history.

(56) References Cited

U.S. PATENT DOCUMENTS

2009/0320592 A1* 12/2009 Glenn ............... B81B 3/0051
                                                    73/504.12
2013/0299923 A1* 11/2013 Classen ............. B81B 3/0018
                                                    257/415

* cited by examiner

*Primary Examiner* — Herbert K Roberts
(74) *Attorney, Agent, or Firm* — Haley Guiliano LLP; Joshua Van Hoven; Maryam Imam (57) ABSTRACT

A MEMS device includes at least one proof mass, the at least one proof mass is capable of moving to contact at least one target structure. The MEMS device further includes at least one elastic bump stop coupled to the proof mass and situated at a first distance from the target structure. The MEMS device additionally includes at least one secondary bump stop situated at a second distance from the target structure, wherein the second distance is greater than the first distance, and further wherein the at least one elastic bump stop moves to reduce the first distance when a shock is applied.

20 Claims, 10 Drawing Sheets

ELASTIC BUMP STOPS FOR MEMS DEVICES

CROSS REFERENCE TO RELATED APPLICATIONS

This application is a continuation application of U.S. patent application Ser. No. 14/050,201, filed on Oct. 9, 2013, by Qiu et al., and entitled "Elastic Bump Stops for MEMS Devices", which claims priority to U.S. Provisional Application No. 61/790,300 filed on Mar. 15, 2013, by Qiu et al., and entitled "Elastic Bump Stops for MEMS Devices".

BACKGROUND

Various embodiments of the invention relate generally to bump stops and particularly to elastic bump stops used in microelectromechanical systems (MEMS) device. A known problem with MEMS devices is upon experiencing a shock, the MEMS device undergoes chipping at corners when a moving structure contacts a target. This clearly leads to undesirable effects not to mention a short lifetime of the MEMS device as well as increased costs and other foreseen deterioration. Bump stops have been historically employed to aid in reducing the impact experienced by MEMS devices. However, such measures have yielded little positive results particularly in light of their stiffness.

What is needed is a MEMS device with reduced impact force upon encountering a shock.

SUMMARY

Briefly, an embodiment of the invention includes a MEMS device having at least one proof mass, the at least one proof mass is capable of moving to contact at least one target structure. The MEMS device further includes at least one elastic bump stop coupled to the proof mass and situated at a first distance from the target structure. The MEMS device additionally includes at least one secondary bump stop situated at a second distance from the target structure, wherein the second distance is greater than the first distance, and further wherein the at least one elastic bump stop moves to reduce the first distance when a shock is applied.

A further understanding of the nature and the advantages of particular embodiments disclosed herein may be realized by reference of the remaining portions of the specification and the attached drawings.

BRIEF DESCRIPTION OF THE DRAWINGS

FIGS. 1(a) through 2(b) each show a conceptual diagram of a MEMS device, in accordance embodiments of the invention.

DETAILED DESCRIPTION OF EMBODIMENTS

The following specification describes a MEMS device with multiple bump stops (also referred to herein as "elastic bump" or "bump") to reduce the affect of a shock to the MEMS device.

As used herein "stiction" is an undesirable situation which arises when surface adhesion forces are higher than the mechanical restoring force of a MEMS structure or MEMS device. Stiction is recognized to often occur in situations where two surfaces with areas in close proximity come in contact. The greater the contact area at both macroscopic and microscopic roughness levels, the greater the risk of stiction. At the microscopic level, soft materials can deform, effectively increasing contact area. Surfaces can be unintentionally brought into contact by external environmental forces including vibration, shock and surface tension forces that are present during aqueous sacrificial release steps often used in micro-fabrication processes. Adherence of the two surfaces may occur causing the undesirable stiction.

Particular embodiments and methods of the invention disclose a MEMS device having at least one proof mass. The proof mass is capable of moving to contact at least one target structure. The MEMS device further includes at least one primary bump stop that is coupled to the proof mass and situated at a first distance from the target structure. The primary bump stops maybe an elastic bump stop. The MEMS device additionally has at least one secondary bump stop situated at a second distance from the target structure. The second distance is greater than the first distance. The primary bump stop moves to reduce the first distance when a shock is applied to the MEMS device. Flexible element coupled to the proof mas reduces the impact of the force experienced by the proof mas to prevent chipping. In various embodiments of the invention, reduced impact force permits use of smaller bump stops for less stiction. Additionally, the increased flexible element restores force for a secondary bump stop. In some embodiments, the target structure is positioned at a tilt relative to the elastic bump stops and the elastic bump stops reduce chipping caused by impact at the corners of the target structure, such as the MEMS device, because the bump stop can conform to the tilt. Stated differently, elastic bump stops are utilized to help prevent chipping by compressing to help break out a secondary bump stop contact stiction.

In the described embodiments, MEMS device may include one or more proof masses, one or more primary bump stops and one or more secondary bump stops. The primary bump stop may be more flexible than the secondary bump stop. The primary bump stop may be coupled to a target structure or connected to the proof mass. Similarly, the secondary bump stop may be coupled to the target structure or the proof mass. The target structure may be a stationary or moveable.

The MEMS device may include a first contact surface and a second contact surface coupled to the proof mass. In some embodiments, the first contact surface may be on the primary bump stop or the proof mass or the target structure; the second contact surface may be on the secondary bump stop or the proof mass or the target structure or the primary bump stop. In some embodiments, the first target surface may be on the primary bump stop or the proof mass or the target structure; the second target surface may be on the secondary bump stop or the proof mass or the target structure. The second target structure and the second contact are farther apart than the first target structure and the first contact. The first contact surface may be coupled to the proof mass via a flexible element or coupled directly to the proof mass.

Figure 1A:
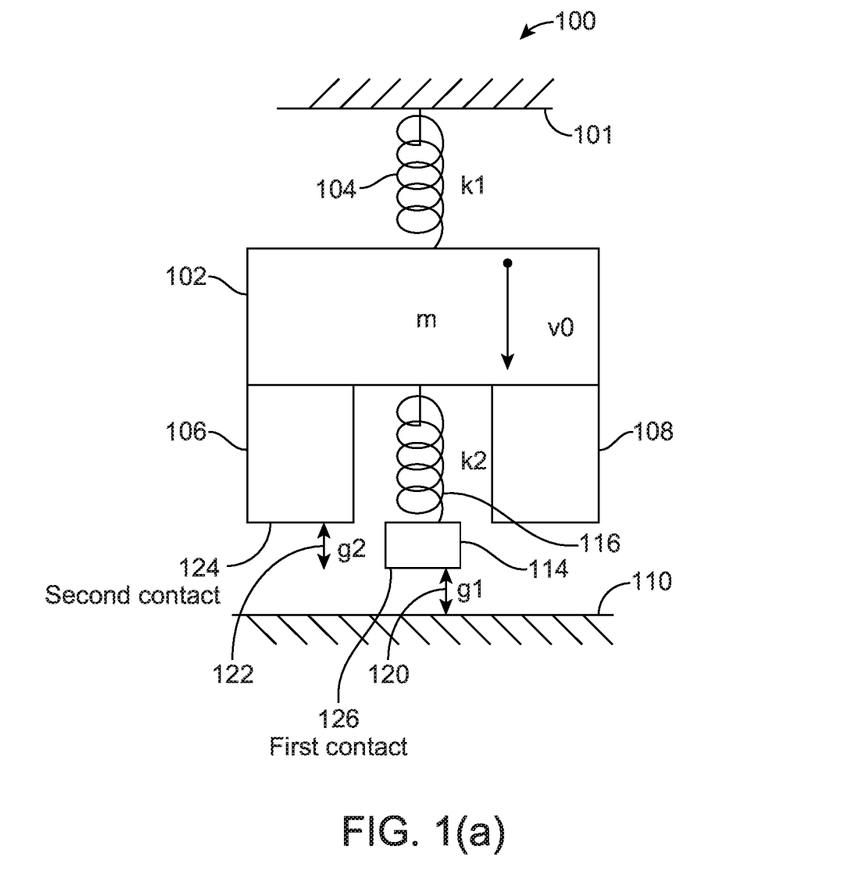

In the described embodiments, elastic member, flexible element, spring, and flexible structure maybe used interchangingly. FIGS. 1(a) through 2(b) each show a conceptual diagram of a MEMS device, in accordance with various embodiments of the invention. In FIG. 1(a) the first contact is identified as 126 whereas the second contact is identified as 124. The first and second target contacts are 110.

Figure 1B:
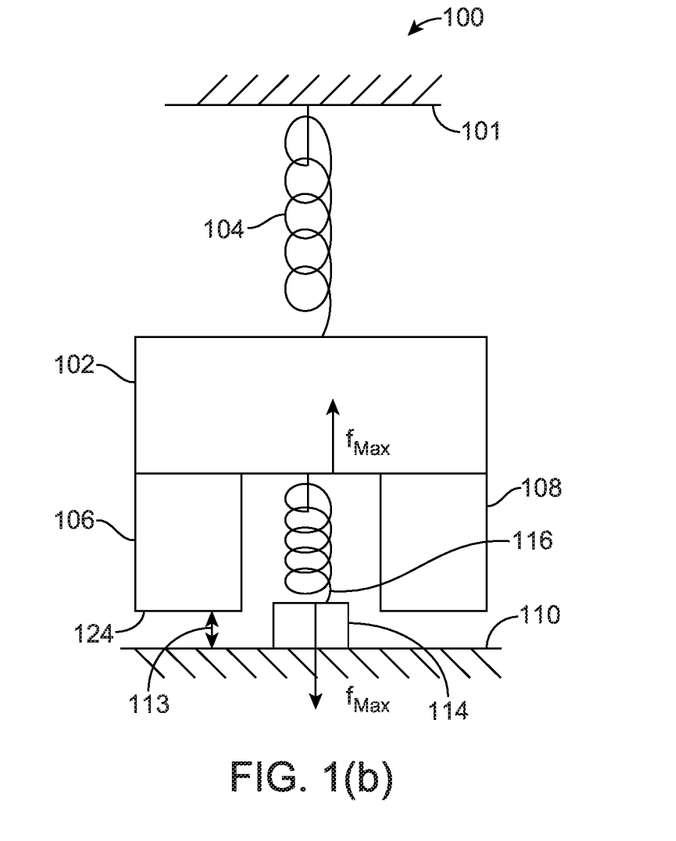
Figure 1C:
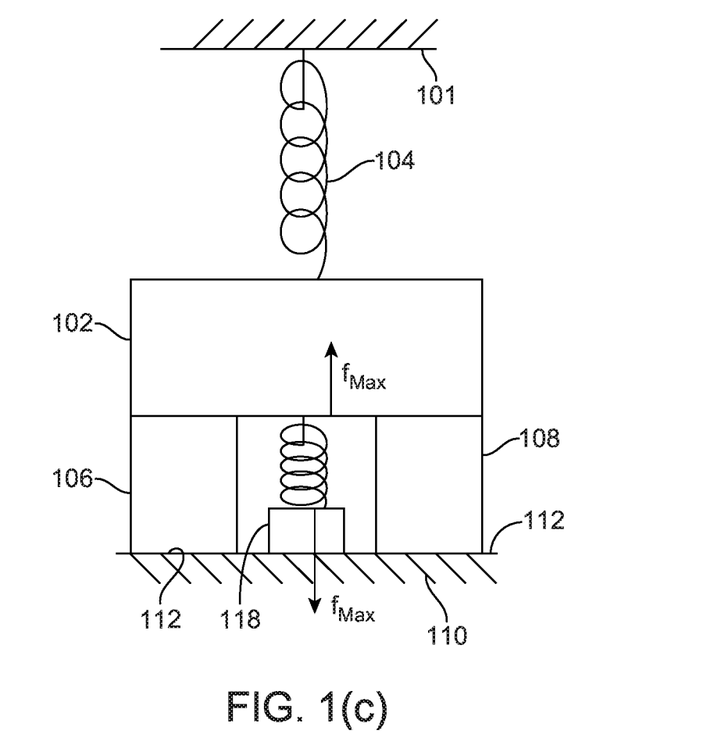

Referring now to FIG. 1(a), a conceptual diagram of MEMS device 100 with proof mass 102 flexibly extending from a fixed structure 101, represented by the spring 104 having associated therewith a spring constant 'k1'. The mass 'm' moves down in relation to fixed structure 101 with the spring 104 extending (or flexing) downward. Along with proof mass 102, two secondary bump stops 106 and 108 are shown connected to proof mass 102 and move downwardly with proof mass 102. Secondary bump stops 106 and 108 help to protect proof mass 102 from making contact with another structure 110 especially upon the proof mass experiencing a great shock, as shown in FIG. 1(c). In an embodiment structure 110 may be stationary, in another embodiment, structure 110 may be moveable.

Further shown in FIG. 1(a) is primary contact 114 that flexibly extends downward via and along with a spring 116 that has a spring constant 'k2'. Structure 114 makes contact with structure 110 at contact 118, as shown in FIG. 1(c), when structure 114 moves downwardly toward the structure 110.

The structure 114 is shown, in FIG. 1(a), to be at a distance 120, 'g1', from structure 110. Secondary bump stops 106 and 108 are shown to be at a distance, 'g1+g2' away from structure 110 prior to proof mass 102 experiencing a shock or moving down toward the structure 110. The elastic bump stop operation, shown in FIGS. 1(a)-(c) has at least two advantages. One such advantage is to reduce the impact force between secondary bump stops 106 and 108 and structure 110, another is to have extra restoring force for structure 110.

In FIG. 1(a), in an embodiment of the invention, MEMS device 100 is a gyroscope or an accelerometer. While the MEMS device is at rest position, secondary bump stops 106 and 108 are not compressed. When proof mass 102 starts to move with a velocity v0 and when the velocity is small, as shown in FIG. 1(b), primary bump stop 114 contacts structure 110 to reduce g1 to almost zero and secondary bump stops 106 and 108 are at distance 113 away from structure 110. In the embodiment of FIG. 1(b), the force upon proof mass 102 is less than the force proof mass 102 of the embodiment of FIG. 1(c) experiences. In an embodiment and method of the invention, the primary bump stop 114 moves translationally toward the structure 110.

In FIG. 1(a), secondary bump stops 106 and 108 are shown at a distance that is the sum of g1 and g2 at rest and primary bump stop 114 is shown at the gap 120 or the distance of g1 at rest. Whereas, in FIG. 1(b), the distance g1 is nearly zero and the distance 113 is smaller than the distance g1+g2 (of FIG. 1(a)). In FIG. 1(a)-(c), the distances g1 and g2, i.e. gaps 120 and 122, respectively, are zero. 'g1' and 'g2' each represent the gaps at rest.

Stated differently, FIG. 1(a) shows primary bump stop 114, with secondary contacts 106 and 108, between proof mass 102 and the structure 110 at rest, which limits the primary bump stop 114 deflection. Obviously, primary bump stop 114 comes in contact with structure 110 before the secondary bumps 106 and 108 come in contact with structure 110. The contact force between the primary bump stop 114 and structure 110 are indicated with the following:

$$f_{bounceMax} = v_0 \sqrt{mk_2}, f_{max} = k_2 g_2. \qquad \text{Eq.(1)}$$

If v0 is low and the secondary bump stops 106 and 108 are not engaged during impact, f_bounceMax is the maximum force experienced by primary bump stop 114. In the embodiment of FIG. 1(b), v0 is smaller than it is in the embodiment of FIG. 1(c). If v0 is high as in shown in FIG. 1(c), secondary bump stops 106 and 108 move to establish contact with the structure 110, and f_Max is the maximum force determined by the stiffness and deflection of primary bump stop 114. As Eq. (1) indicates, either f_bounceMax or f_Max are lowered by low elastic bump stop stiffness k2. If the secondary bump stops 106 and 108 move to contact structure 110, the elastic member (spring 116 with stiffness k2) applies an extra force f_Max to restore secondary bump stops 106 and 108 and target structure 110. Secondary bump stops 106 and 108 are compressed to help break out the secondary bump stop contact stiction.

Figure 2A:
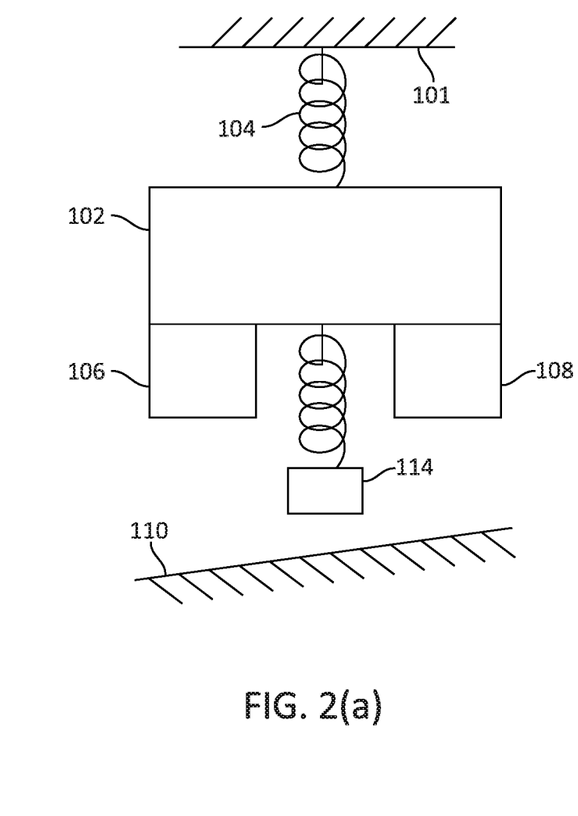
Figure 2B:
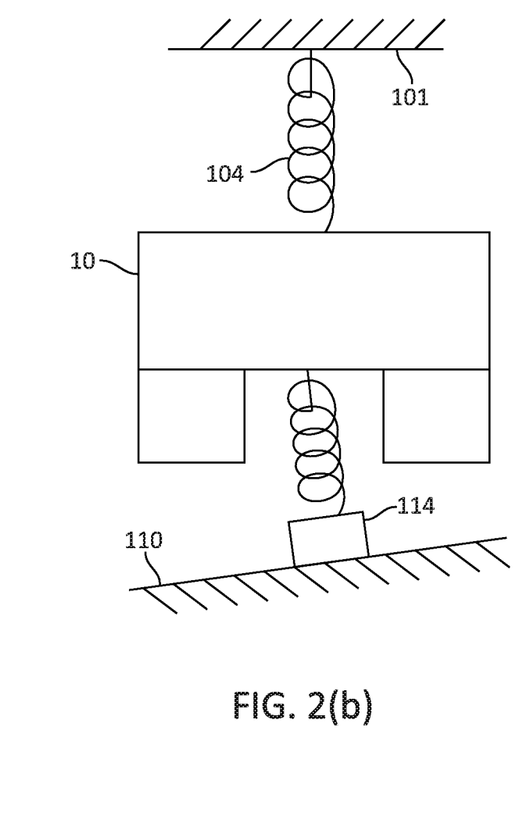

FIGS. 2(a) and 2(b) show that the bump stops can conform to the contact target tilt at rest position, as shown in FIG. 2(a). At contact state (shown in FIG. 2(b)), primary bump stop 114 can conform to the tilted contact target, or structure 110. In this embodiment, structure 110 is not stationary. FIGS. 2(a) and 2(b) show another advantage of an elastic bump stop and that is, it conforms to the contact target structure with its rotational compliance. By conforming to two contact surfaces, the contact area increases thus the contact stress, i.e., contact force divided by contact area, decreases. This reduces the risk of breakage at contact surfaces.

As shown in FIG. 2, secondary bump stops 106 and 108 can also be implemented between two moving structures such as proof mass 102 and structure 110. Elastic bump stops have the following advantages. One is flexible contacts that reduce the impact force to proof mass 102 to prevent chipping, thereby permitting use of smaller bump stops with less stiction. Another is increasing the flexible contact to restore the force of the secondary bump stop 124 and reduce the elastic bump stops thereby reducing chipping caused by impact at the corners of proof mass 102. This is because the bump stop can conform to the tilt (shown in FIGS. 2(a) and 2(b)).

Figure 3:
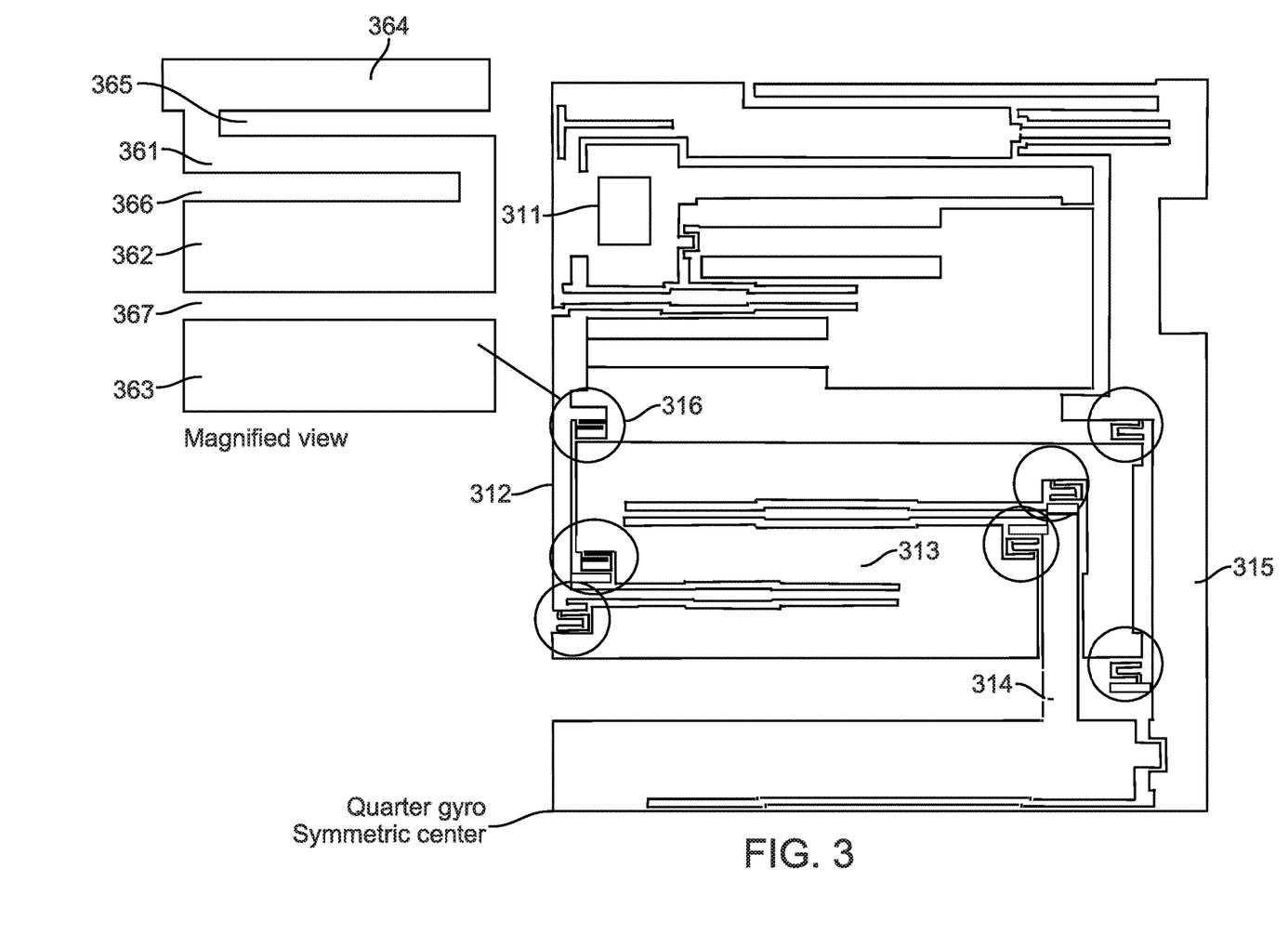
FIG. 3 shows a portion of a gyroscope with elastic bump stops, in accordance with an embodiment of the invention.

FIG. 3 shows a portion of a gyroscope with elastic bump stops, in accordance with an embodiment of the invention. In FIG. 3, only a quarter of the gyroscope is shown, with the lower left corner pointing as the symmetric center. The gyroscope has anchor at 311, a system of springs, proof masses, and linking structures. The proof mass 313 is the main sensing element; its motion during shock is constrained by bump stops 316 (and other elastic bump stops in circles) against linking structures 312, 314, and 315. Elastic bump stops engage in either the Y-directional shock, or the Z-directional shock. During a Z-directional shock, proof mass 313 initially only has Z-motion, but due to the constraint of the springs, the Z-motion energy is partially transferred to RX (rotation around X-axis) motion. Following this proof mass RX motion, the elastic bump stops also rotate in RX direction, and engage to close the contacts. Each primary bump stop 362 is supported by a flexible beam 361 to the proof mass 364. The structure 363 is at the opposing structure. There are three gaps 365, 366, 367 in the elastic bump stop structure. In an embodiment, the flexible beam 361 (also referred to herein as "flexible element") is a cantilever beam. In an embodiment of the invention, the flexible beam 361 is a clamped-clamped beam.

When a shock is applied, first the gap 367 closes, due to the flexibility of the flexible beam 361, the contact force between 362 and the structure 363 are reduced. If the shock is large enough, the gaps 365 and 366 also close, to prevent further relative motion between the proof mass 364 and the structure 363.

Figure 4A:
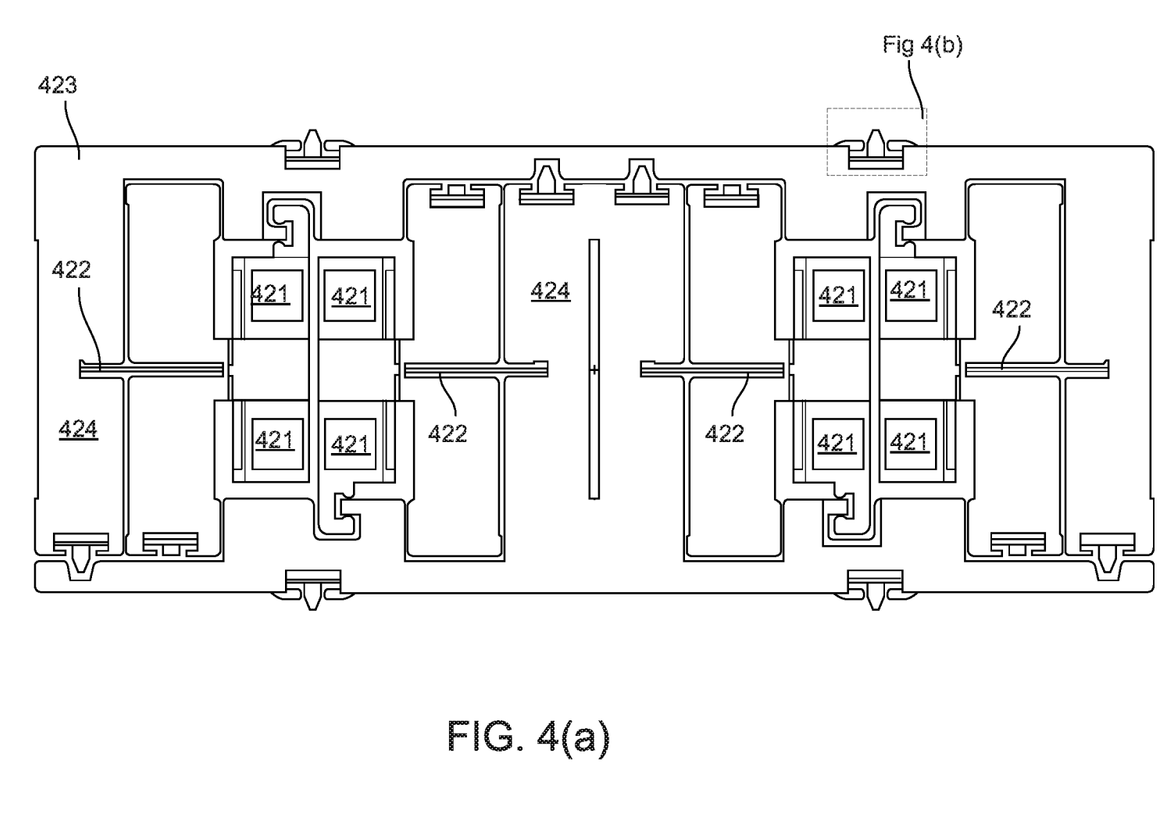
FIGS. 4(a) through (d) each show various views of out-of-plane elastic bump stops, in accordance with other embodiments of the invention.
Figure 4B:
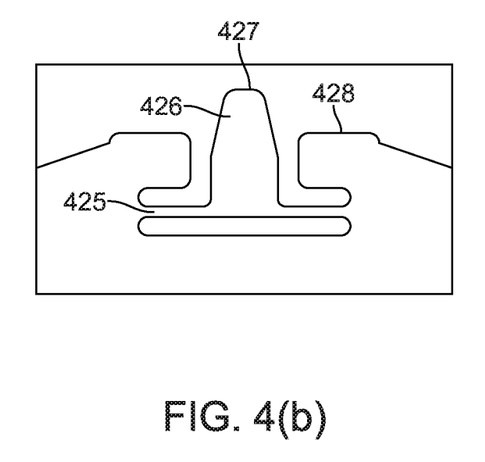
Figure 4C:
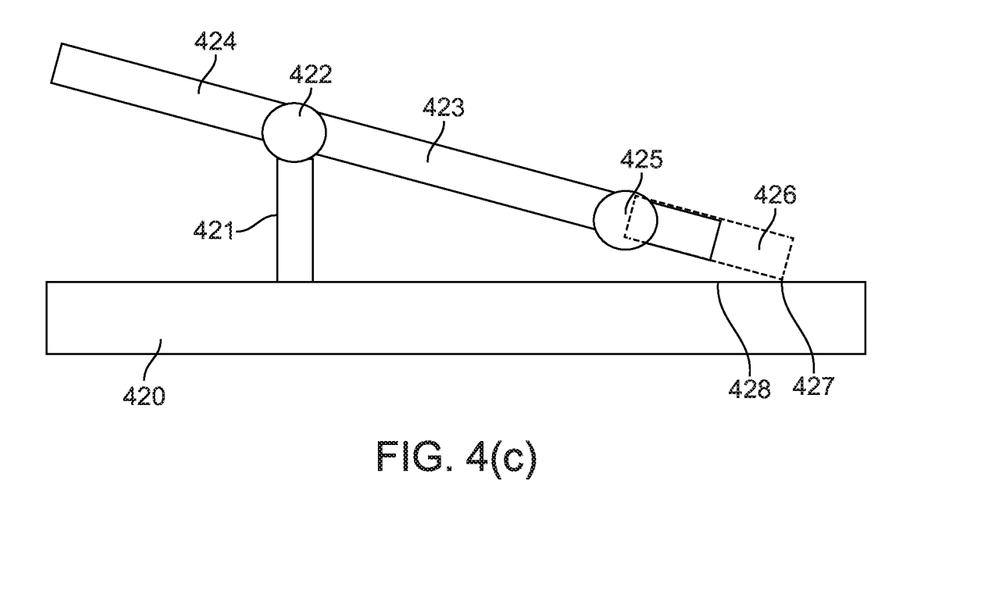
Figure 4D:
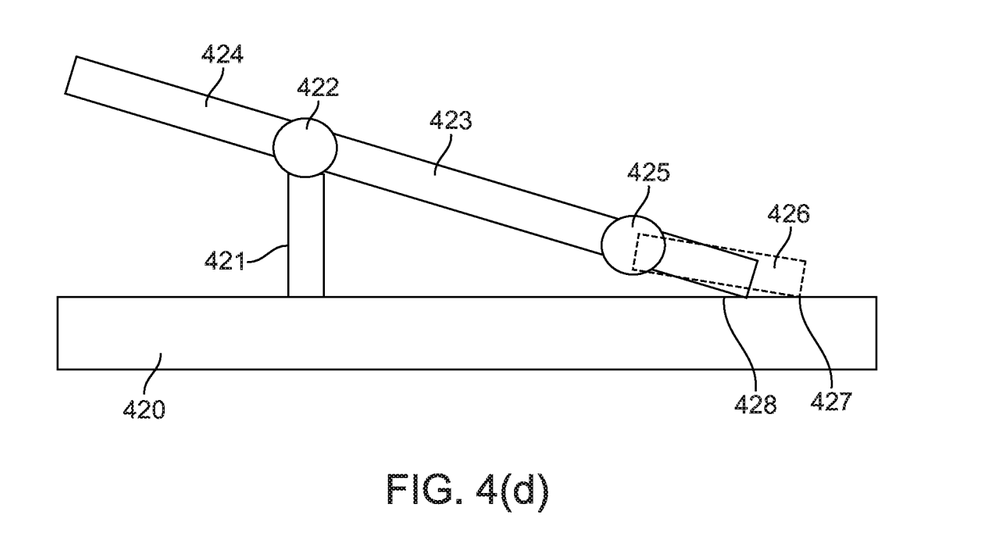

FIGS. 4(a) through (d) each show various views of elastic bump stops in an accelerometer where the motion of the proof mass is out-of-plane, in accordance with other embodiments of the invention. FIG. 4(a) shows an accelerometer to sense linear acceleration along the Z-axis. FIG. 4(b) shows a portion of the accelerometer enlarged. In FIGS. 4(a)-4(d), motion along the Z axis is initiated by asymmetric proof mass couple 423 and 424, supported by pivot springs 422 to anchor 421 with the proof mass 423 being heavier than the proof mass 424. Proof masses 424 and 423 are anchored by anchor 421 to substrate 420. Bump stops are situated on each side of the masses 423 and 424. Either bump stop can contact the substrate 420 depending on the direction of the Z directional shock. The side view of operations, shown in FIGS. 4(c) and 4(d), shows the bumps on the heavier mass 423. Primary bump stop 426 is shown coupled to the proof mass 423 by flexure beam 425. A portion of proof mass 423 that extends beyond flexure beam 425 functions as a secondary bump stop. During low intensity shock along the Z-axis, tip 427 of the primary bump stop 426 comes in contact with the substrate 420. Due to the flexibility of primary bump stop 426, the contact force is reduced. FIG. 4(d) shows the accelerometer when a higher intensity shock along the Z-axis, proof mass 423 comes in contact with substrate 420 at 428. The restoration force from flexure beam 425 creates a strong restoring force for secondary bump 428 in addition to the weaker restoration force from pivot springs 422.

Figure 5A:
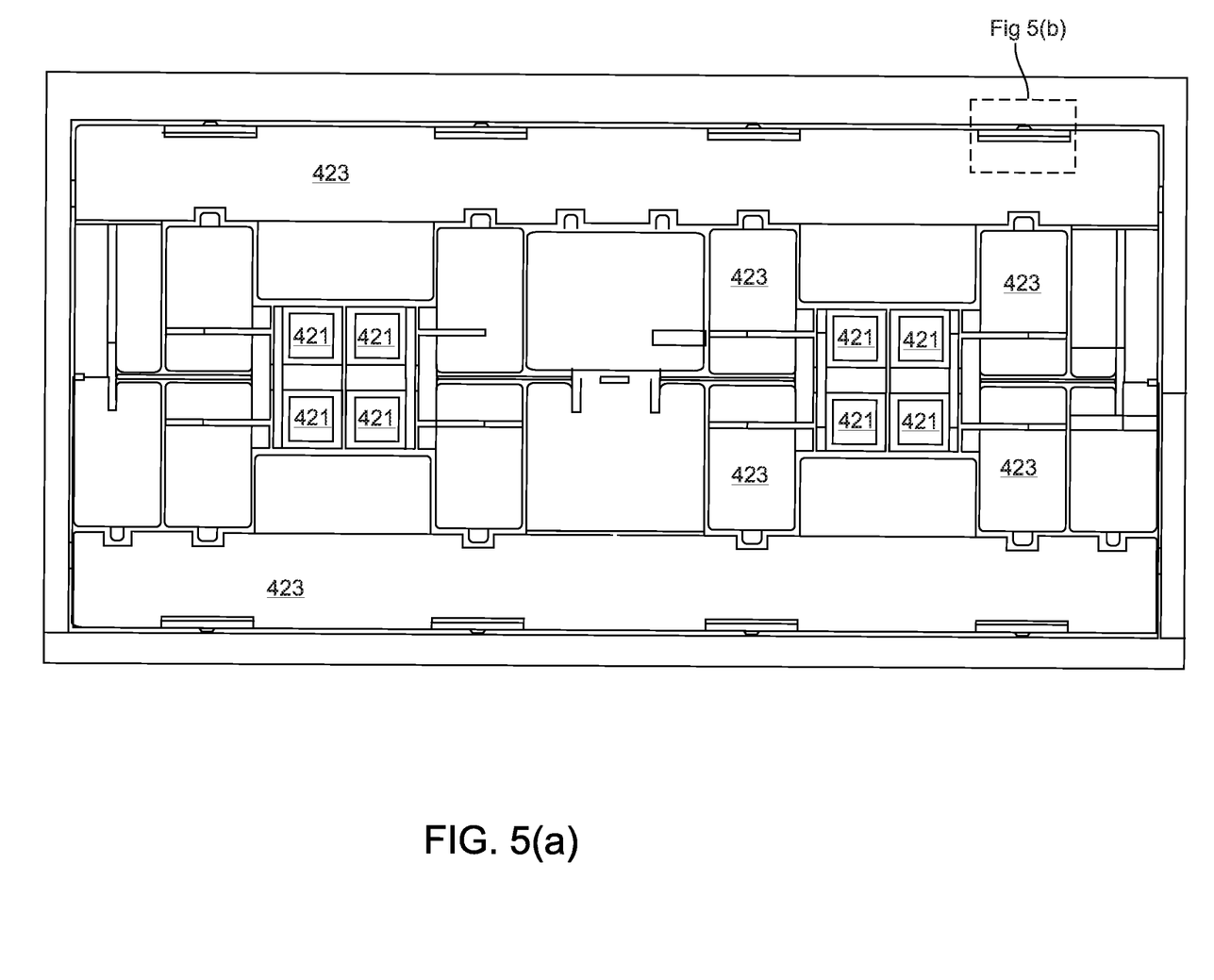
FIGS. 5(a) through (g) show various views of in-plane elastic bump stops, in accordance with yet another embodiment of the invention.
Figure 5B:
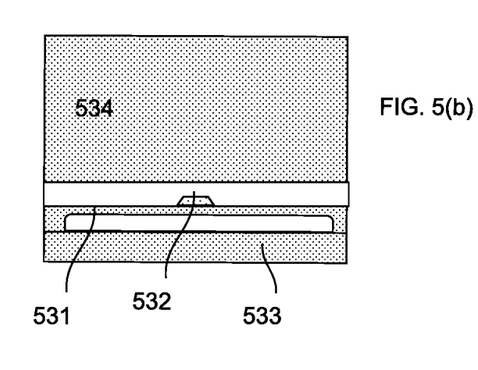
Figure 5C:
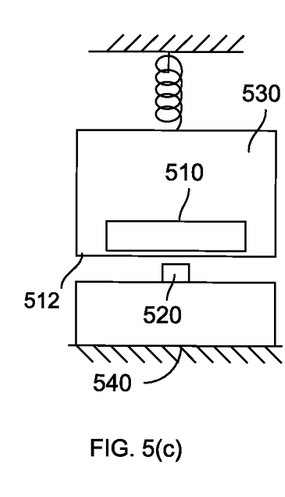
Figure 5D:
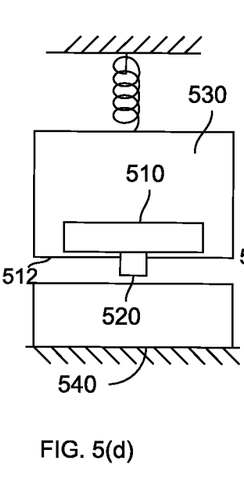

FIG. 5(a) shows a z-axis accelerometer for sensing linear acceleration along the Z-axis where the bump stops are in the plane of the substrate. 502 identifies a bump stop similar to that of FIG. 5(d).

Figure 5E:
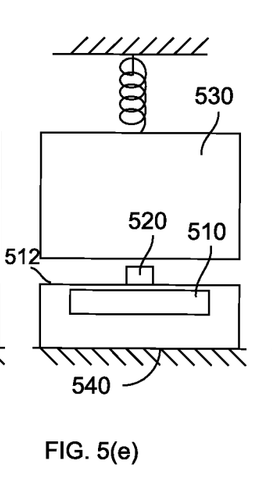
Figures 5F, 5G:
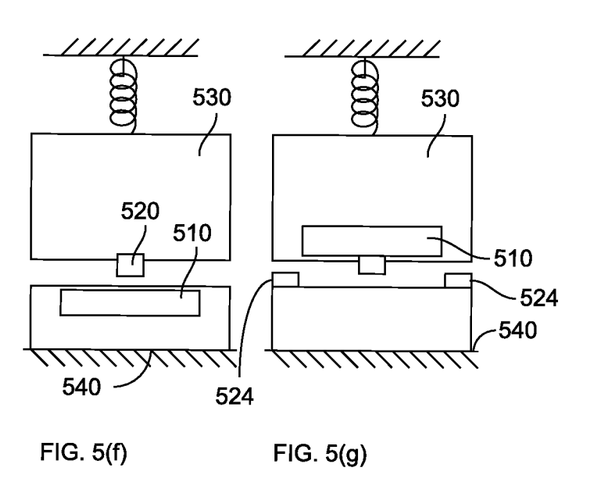

FIGS. 5(b) through 5(f) show implementations of the five embodiments of the bump stop 520 and elastic member 510. In one embodiment, the elastic member may be a clamp-clamp beam. FIG. 5(c) shows elastic member 510 being coupled to proof mass 530. Bump 520 is coupled to fixed structure 540. Target structure 540 may be a fixed structure. When the MEMS device experiences acceleration along the Z-axis, elastic member 510 contacts bump stop 520 before secondary bump stops 512 contact the target structure 540. FIG. 5(d) shows bump stop 520 coupled to proof mass 530 by elastic member 510. When proof mass 530 moves, bump stop 520 contacts target structure 540 before secondary bump stops 512 contacts the target structure 540. FIG. 5(e) shows bump stop 520 coupled to target structure 540 by elastic member 510. When proof mass 530 moves, bump stop 520 contacts proof mass 530 before the secondary bump stops 512 contact the proof mass 530. In FIG. 5(f), bump stop 520 is coupled to proof mass 530. In FIG. 5 (g) is another embodiment of FIG. 5 (d) wherein secondary bump stops 524 are coupled to the target structure 540. When proof mass moves towards target structure, bump stop 520 contacts target structure 540 before secondary bump stops 524 contact the proof mass 530. In an embodiment, secondary bump stops 512 may by a flat structure whereas secondary bump stop 524 may be extensions on the fixed structure.

Thus, in accordance with the various embodiments and methods of the invention, an elastic bump stop design with a second contact that limits the elastic bump stop deflection so as to prevent the bump stop function is disclosed. The elastic bump stop design with the second contact helps restore the second contact and conforms to the contact surface by the rotational compliance of the elastic member. The elastic bump stop design with the first contact member either flattens out, or not, against the contact target. Both behaviors can be implemented by specific elastic bump stop designs.

The embodiments and methods disclosed herein can also apply to a compass, in addition to a gyroscope, with the compass comprising of moveable elements. Although the description has been described with respect to particular embodiments thereof, these particular embodiments are merely illustrative, and not restrictive.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A MEMS device comprising:
    at least one proof mass coupled to a fixed structure through a spring;
    a first bump stop coupled to the at least one proof mass through a flexible element having a first contact surface;
    a secondary bump stop having a second contact surface, the secondary bump stop protruding from the at least one proof mass,
    wherein the flexible element is directly connected to the secondary bump stop at a first side of the flexible element and directly connected to the first bump stop at a second side of the flexible element, the second side opposite to the first side;
    wherein the first contact surface of the first bump stop faces at a first target structure surface of a first target structure, and
    further wherein, the second contact surface of the secondary bump stop faces at a second target structure surface of the first bump stop, and
    before the at least one proof mass extends toward the first target structure, a first distance is defined by a distance between the first contact surface of the first bump stop and the first target structure surface and a second distance is defined by a distance between the second contact surface and the second target structure surface,
    further wherein in response to the at least one proof mass extending toward the first target structure, the first bump stop extends toward the first target structure and the first contact surface of the first bump stop makes contact with the first target structure at the first target structure surface,
    further wherein the flexible element flexes thereby causing the secondary bump stop to make contact at the second target structure surface of the first bump stop.

2. The MEMS device of claim 1, further including a substrate onto which the first target structure is formed, wherein the second contact surface faces at the first target structure.

3. The MEMS device of claim 2, wherein the at least one proof mass is configured to extend toward the substrate when the secondary bump stop extends toward the substrate.

4. The MEMS device of claim 3, wherein the first bump stop is configured to extend toward and make contact with the substrate at the first target structure surface when the at least one proof mass extends toward the first target structure.

5. The MEMS device of claim 4, wherein the flexible element is configured to flex when the at least one proof mass extends toward the first target structure thereby causing the secondary bump stop to make contact with the substrate at the second contact surface.

6. The MEMS device of claim 5, wherein the first target surface is smaller than the second contact surface.

7. The MEMS device of claim 2, wherein the at least one proof mass is configured to move in a plane substantially parallel to a plane of the substrate.

8. The MEMS device of claim 2, wherein the at least one proof mass is configured to move out of a plane parallel to a plane of the substrate.

9. The MEMS device of claim 1, wherein the flexible element is a torsional spring.

10. The MEMS device of claim 1, wherein the flexible element is a clamped-clamped beam.

11. The MEMS device of claim 1, wherein the at least one proof mass is configured to move translationally.

12. The MEMS device of claim 1, wherein the at least one proof mass is configured to move rotationally.

13. The MEMS device of claim 1, wherein the MEMS device is a gyroscope or an accelerometer.

14. The MEMS device of claim 1, wherein the flexible element is a cantilever beam.

15. A method comprising:
  causing a first contact surface of a first bump stop to face a first target structure surface of a first target structure toward which at least one proof mass, of a MEMS device, is destined to extend,
    wherein the first bump stop is coupled to the at least one proof mass through a flexible element and has a first contact surface and a second bump stop is coupled to the at least one proof mass and has a second contact surface,
    wherein the second bump stop protrudes from the at least one proof mass, the second contact surface faces a second target structure surface of the first bump stop and before the at least one proof mass extends toward the first target structure, a first distance is defined by a distance between the first contact surface of the first bump stop and the first target structure surface of the first target structure and a second distance is defined by a distance between the second contact surface and the second target structure surface,
    wherein the flexible element is directly connected to the second bump stop at a first side of the flexible element and directly connected to the first bump stop at a second side of the flexible element, the second side opposite to the first side;
  causing the at least one proof mass to extend toward the first target structure;
  in response to the at least one proof mass extending toward the first target structure, the first bump stop extending toward and making contact with the first target structure at the first target structure surface; and
  in response to the first bump stop extending toward and making contact with the first target structure, the flexible element flexes and causes the second bump stop to make contact at the second target structure surface of the first bump stop.

16. The method of claim 15, wherein the at least one proof mass is configured to extend toward a substrate when the second bump stop extends toward the substrate.

17. The method of claim 16, further comprising the first bump stop extending toward and making contact with the substrate at the first target surface when the at least one proof mass extends toward the first target structure, the first target structure formed onto the substrate.

18. The method of claim 16, wherein the flexible element extends in response to the at least one proof mass extending toward the first target structure thereby causing the second bump to stop making contact with the substrate at the second contact surface.

19. The method of claim 16, further comprising the at least one proof mass moving in a plane substantially parallel to a plane of the substrate.

20. The method of claim 16, further comprising the at least one proof mass moving out of a plane parallel to a plane of the substrate.

* * * * *